United States Patent
Koyama et al.

(10) Patent No.: US 6,769,121 B1
(45) Date of Patent: Jul. 27, 2004

(54) PROGRAM EXECUTION DEVICE AND PROCESS MIGRATING METHOD THEREOF AND STORAGE MEDIUM WHICH STORES PROCESS MIGRATION CONTROL PROGRAM

(75) Inventors: Kazuya Koyama, Tokyo (JP); Satoru Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/489,032

(22) Filed: Jan. 21, 2000

(30) Foreign Application Priority Data

Jan. 22, 1999  (JP) ............................................. 11-014907

(51) Int. Cl.⁷ ........................ G06F 09/46; G06F 15/16; G06F 15/173; G06F 15/177
(52) U.S. Cl. ...................... 718/100; 718/104; 709/201; 709/221; 709/226
(58) Field of Search ................................ 709/100–203

(56) References Cited

U.S. PATENT DOCUMENTS

| | | | |
|---|---|---|---|
| 5,550,962 A | * 8/1996 | Nakamura et al. | 709/232 |
| 5,603,031 A | 2/1997 | White et al. | |
| 5,692,192 A | * 11/1997 | Sudo | 709/105 |
| 5,845,079 A | * 12/1998 | Wada et al. | 709/223 |
| 5,892,944 A | * 4/1999 | Fukumoto et al. | 709/100 |
| 5,893,912 A | * 4/1999 | Freund et al. | 707/103 R |
| 5,909,483 A | * 6/1999 | Weare et al. | 379/88.18 |
| 5,918,248 A | * 6/1999 | Newell et al. | 711/147 |
| 5,999,963 A | * 12/1999 | Bruno et al. | 709/104 |
| 6,173,442 B1 | * 1/2001 | Agesen et al. | 717/141 |
| 6,230,239 B1 | * 5/2001 | Sakaki et al. | 711/112 |
| 6,256,675 B1 | * 7/2001 | Rabinovich | 709/241 |
| 6,260,068 B1 | * 7/2001 | Zalewski et al. | 709/226 |
| 6,269,390 B1 | * 7/2001 | Boland | 709/100 |
| 6,442,663 B1 | * 8/2002 | Sun et al. | 711/202 |
| 6,457,064 B1 | * 9/2002 | Huff et al. | 709/318 |

FOREIGN PATENT DOCUMENTS

| | | |
|---|---|---|
| JP | 62-067641 | 3/1987 |
| JP | 7-073051 | 3/1995 |
| JP | 7-182174 | 7/1995 |
| JP | H9-146900 | 6/1997 |
| JP | 9-146904 | 6/1997 |

OTHER PUBLICATIONS

Information Processing Association Research Reports, vol. 92, No. 91 (92–DPS–58), Information Processing Association, Ltd. (Nov. 20, 1992), pp 173–180 (Patent Office CSDB Reference No. CSNT200000122020).

Information Processing Association Research Reports, vol. 93, No. 68 (93–OS–61), Information Processing Association, Ltd. (Aug. 18, 1993), pp. 17–24 (Patent Office CSDB Reference No. CSNT200000002003).

Information Processing Association Research Reports, vol. 98, No. 33 (98–OS–78 Information Processing Association, Ltd. (May 8, 1998), pp. 39–46 (Patent Office CSDB Reference No. CSNTI99800624006).

* cited by examiner

*Primary Examiner*—Meng-Al T. An
*Assistant Examiner*—Syed Ali
(74) *Attorney, Agent, or Firm*—Foley & Lardner LLP

(57) ABSTRACT

A program execution device connected to other computer over a network including a thread management unit for setting values of a process status flag and a thread state table according to an execution state of a thread, and a process management unit for referring to the values of the process status flag and the thread state table at the execution of a process migration instruction to set the process status flag to have a value indicating that migration is being executed only when process migration is enabled, as well as checking the process status flag at a thread in execution in the process, when the process status flag has the value indicating that process migration is in execution, interrupting execution of the thread, and executing processing for process migration when all the threads in the process enter the stopped state.

17 Claims, 12 Drawing Sheets

PROGRAM EXECUTION DEVICE AND PROCESS MIGRATING METHOD THEREOF AND STORAGE MEDIUM WHICH STORES PROCESS MIGRATION CONTROL PROGRAM

BACKGROUND OF THE INVENTION

1. Field of the Invention

The present invention relates to a program execution device capable of migrating, at a plurality of computers (hereinafter, suitably referred to as a program execution device) connected over a network, a process being executed to other computer while preserving its execution state and a process migrating method thereof, and a storage medium which stores a process migration control program.

2. Description of the Related Art

Set up of a distributed system which conducts processing extending over a plurality of computers connected over a network is conventionally realized by generating a software module for each individual computer and conducting communication between computers in the form of communication between software modules. Programmers therefore need to design and form a communication mechanism between modules in addition to processing of the system itself, which makes system realization difficult.

Under these circumstances, proposed as a technique of setting up such a distributed system with ease is a process migration technique by which a process being executed goes from one computer to another to enable one program and one module to realize processing on a plurality of computers. As a conventional technique of this kind, Telescript disclosed in Japanese Patent Laying-Open No. 7-182174, for example, enables process-migration of an object and a thread which is a program execution state among computers on a basis of a unit called agent. Then, describing an instruction "go" in the program enables process migration at a time when the instruction "go" is called.

Programs are all described in dedicated languages independent of hardware and run on an interpreter called engine. Process migration is realized by transferring the program described in the dedicated language and its execution state on the interpreter to an interpreter on a migration destination computer and reproducing there the original process prior to the migration based on the transferred program and execution state. In the technique disclosed in the literature, an individual agent to be migrated is a single thread and a process with a plurality of threads can not be migrated.

Another technique of setting up a distributed system is migrating a thread stack from a predetermined processor to another processor in a system where a plurality of processors share a single address space. As a conventional technique of this kind, disclosed, for example, in Japanese Patent Laying-Open No. 9-146904 is a technique of migrating a thread operating on a predetermined processor onto a memory region peculiar to other processor only by modifying an offset of a memory address. The system disclosed in the literature only realizes migration of one thread stack within a single address space and not migration of an address space itself. The system does not allow simultaneous migration of a plurality of threads either.

In recent years, there are many cases where in computer operation, a program should be described in multi-thread such as a case where communication and window operation are conducted simultaneously and a case where a plurality of processing are executed in parallel to each other. Under these circumstances, demanded is a program language execution environment for easily developing software operating on a plurality of computers connected over a network. As mentioned above, conventional process migration techniques, however, fail to allow migration of such a multi-thread program itself, making description of a complicated migration program with parallelism difficult.

As described above, conventional process migration techniques for use in establishing a distributed system have shortcomings that an object to be migrated is a single thread and that all threads of a process operating in multi-thread can not be migrated in the lump.

In the technique disclosed in Japanese Patent Laying-Open No. 7-182174, an engine itself which is an execution environment operates in multi-thread, while an agent as a migration unit is a single thread only.

In the technique recited in Japanese Patent Laying-Open No. 9-146904, what operates on a distributed system is a multi-thread, while what is to be migrated is an individual thread. In addition, the technique fails to take migration of a multi-thread process including information on an address space into consideration.

In these conventional techniques, a trial of migration of a multi-thread process, for example, causes, while a thread giving a process migration instruction executes serialization of a process, rewriting of a state of the process by other thread to result in generation of a conflict in the serialized data, causes a thread stack or an object in a process to stop with a conflict included as a result of external and forcible suspension of other thread by the thread giving a process migration instruction etc., or causes a situation that because discrimination is impossible between a thread originally suspended and a thread suspended due to process migration, which thread is to be suspended at an migration destination is unknown, all resulting in preventing normal operation.

In addition, the above-described conventional process migration technique is premised on that a program code describing a process to be migrated is a single code which can be migrated at any time during execution. In other words, the technique recited in Japanese Patent Laying-open No. 7-182174, for example, runs a program (code) described in a language independent of a computer on an interpreter. The technique recited in Japanese Patent Laying-Open No. 9-146904 operates a code of a real processor or a code of a virtual processor on an interpreter.

Program code operating on an interpreter, however, has a shortcoming that its execution speed is slower than that of a native code of a real processor.

In addition, processing largely dependent on a computer or an operating system can not be described singly with an interpreter in some cases.

On the other hand, a native code of a real processor limits a target which can be process-migrated only to the same processor environment, so that it fails to realize extensive migration.

Also, an interpreter allows various checks at execution as security, while a native code hardly enables such a security check.

SUMMARY OF THE INVENTION

An object of the present invention is to provide a program execution device which realizes process migration of a process operating in multi-thread to facilitate, when a complicated system which executes parallel execution of programs and a system where a program code dependent on a computer and a program code independent of a computer exist together are to be operated under distributed environments, set-up of such distributed systems with ease, and a process migrating method thereof, and a storage medium which stores a process migration control program.

According to the first aspect of the invention, a program execution device connected to other computer over a network and capable of migrating a process in execution to the other computer while preserving an execution state, comprises a flag indicative of an execution state of a process which is provided for each process, a table indicative of a state of each thread, thread management means for setting values of the flag and the table according to an execution state of a thread, and process management means for referring to the values of the flag and the table at the execution of a process migration instruction to set the flag to have a value indicating that migration is being executed only when process migration is enabled, as well as checking the flag at a thread in execution in the process and interrupting execution of the thread when the flag has the value indicating that process migration is in execution to execute processing for process migration.

In the preferred construction, the process management means executes the processing for process migration when all the threads in the process enter the stopped state.

In another preferred construction, the process management means distinguishes, in a program code to be executed, a computer-independent code to be executed on an interpreter independently of a computer and a computer-dependent code to be executed directly by a CPU dependently on a computer, and when a thread is executing the computer-dependent code, sets the thread at a migration-disabled state.

In another preferred construction, the thread management means preserves information regarding temporarily stopped states including suspend, sleep and synchronization waiting states on a thread stack, and restores the temporarily stopped state including the suspend, sleep or synchronization waiting state using the information regarding the temporarily stopped states on the thread stack received from other computer.

In another preferred construction, the thread management means preserves information regarding temporarily stopped states including suspend, sleep and synchronization waiting states on a thread stack, and restores the temporarily stopped state including the suspend, sleep or synchronization waiting state using the information regarding the temporarily stopped states on the thread stack received from other computer, and the process management means distinguishes, in a program code to be executed, a computer-independent code to be executed on an interpreter independently of a computer and a computer-dependent code to be executed directly by a CPU dependently on a computer, and when a thread is executing the computer-dependent code, sets the thread at a migration-disabled state.

In another preferred construction, the thread management means includes state management means for operating the flag and the table, and scheduling means for conducting scheduling of a thread and synchronization and exclusive control among threads, the scheduling means being realized by a threading function of an operating system.

In another preferred construction, the process management means detects and discriminates codes embedded in a program code which declare migration-enabled and migration-disabled, and when a thread is executing the program code including a code declaring migration-disabled, sets the thread at the migration-disabled state.

According to the second aspect of the invention, a process migrating method of migrating, in a program execution device connected to other computer over a network, a process in execution to the other computer while preserving an execution state, comprising the steps of at the execution of a process migration instruction, checking a state of a thread and only when process migration is enabled, setting a flag indicative of an execution state of a process which is provided for each process to have a value indicating that migration is being executed, checking the flag at a thread in execution in the process, when the flag has the value indicating that process migration is in execution, interrupting execution of the thread, and when all the threads in the process enter the stopped state, executing processing for process migration.

In the preferred construction, at the flag setting step a computer-independent code to be executed on an interpreter independently of a computer and a computer-dependent code to be executed directly by a CPU dependently on a computer are distinguished in a program code to be executed, and when a thread is executing the computer-dependent code, determination is made that the thread is at a migration-disabled state.

In another preferred construction, at the thread execution interrupting step, information regarding temporarily stopped states including suspend, sleep and synchronization waiting states is preserved on a thread stack.

In another preferred construction, at the flag setting step a computer-independent code to be executed on an interpreter independently of a computer and a computer-dependent code to be executed directly by a CPU dependently on a computer are distinguished in a program code to be executed, and when a thread is executing the computer-dependent code, determination is made that the thread is at a migration-disabled state, and at the thread execution interrupting step, information regarding temporarily stopped states including suspend, sleep and synchronization waiting states is preserved on a thread stack.

In another preferred construction, at the flag checking step, a value of the flag is periodically checked.

In another preferred construction, at the flag setting step, codes embedded in a program code which declare migration-enabled and migration-disabled are detected and discriminated, and when a thread is executing the program code including a code declaring migration-disabled, determination is made that the thread is at the migration-disabled state.

According to the third aspect of the invention, a computer readable memory which stores a process migration control program for controlling a program execution device connected to other computer over a network to migrate a process in execution to the other computer while preserving an execution state, the process migration control program comprising the steps of at the execution of a process migration instruction, checking a state of a thread and only when process migration is enabled, setting a flag indicative of an execution state of a process which is provided for each process to have a value indicating that migration is being executed, checking the flag at a thread in execution in the process, when the flag has the value indicating that process migration is in execution, interrupting execution of the thread, and when all the threads in the process enter the stopped state, executing processing for process migration.

According to another aspect of the invention, a program execution device connected to other computer over a network and capable of migrating a process in execution to the other computer while preserving an execution state, comprises a flag indicative of an execution state of a process which is provided for each process, a table indicative of a state of each thread, thread management unit which sets values of the flag and the table according to an execution state of a thread, and process management unit which refers to the values of the flag and the table at the execution of a process migration instruction to set the flag to have a value indicating that migration is being executed only when process migration is enabled, as well as checks the flag at a thread in execution in the process and interrupts execution of the thread when the flag has the value indicating that process migration is in execution to execute processing for process migration.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The program execution device of the present invention facilitates description of a distributed system having parallelism by realizing process migration of a process operating in multi-thread. The program execution device additionally enables process migration in a system where a computer-dependent program code and a computer-independent program code exist together by managing process-migration-enabled and -disabled as thread execution states and managing execution of a computer-dependent program code as a migration-disabled state.

Figure 1:
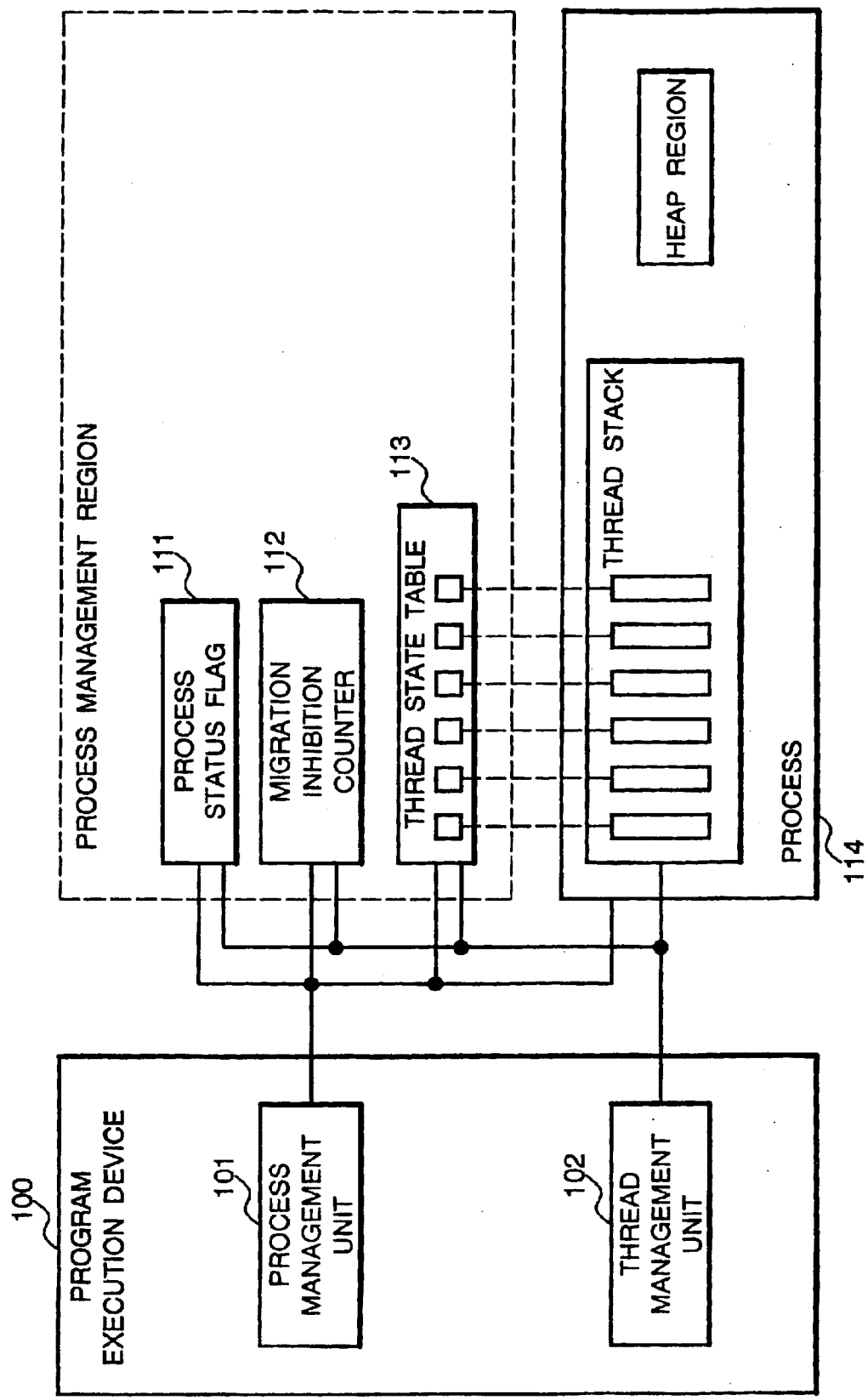
FIG. 1 is a block diagram showing schematic structure of a program execution device for use in explaining a concept of the present invention.

FIG. 1 is block diagram showing schematic structure of a program execution device for use in explaining a concept of the present invention. The program execution device shown in FIG. 1 includes a process management unit 101 and a thread management unit 102 and calls these management units 101 and 102 at the time of conducting operation related to a process and a thread in a program. Then, prepared as information for managing a process 114 are a process status flag 111 indicative of a state of a process, a migration inhibition counter 112 indicative of the number of inhibited states and a thread state table 113 indicative of a state of an individual thread which are managed by the process management unit 101 and the thread management unit 102.

As states of the process 114 indicated by the process status flag 111, provided are states of "migration occurring", "migration being inhibited" and "in ordinary execution". The process 114 ordinarily assumes the state of "in ordinary execution" and enters the state of "migration being inhibited" when any thread included in the process enters the migration inhibited state. When any of the threads is to execute process migration, the process enters the state of "migration occurring".

As states of an individual thread managed by the thread state table 103, provided are "ordinary execution state", "temporarily stopped state" and "wait state". "Ordinary execution state" is further divided into a "migration-enabled state" and a "migration-disabled state". Thread ordinarily assumes the state of "in ordinary execution", and assumes the state of "temporarily stopped" for such a case of long-time stop as suspend, sleep and waiting for synchronization. When other thread gives a process migration instruction and the thread in question temporarily stops for safety's sake in response, the thread in question enters the "wait" state.

Figure 2:
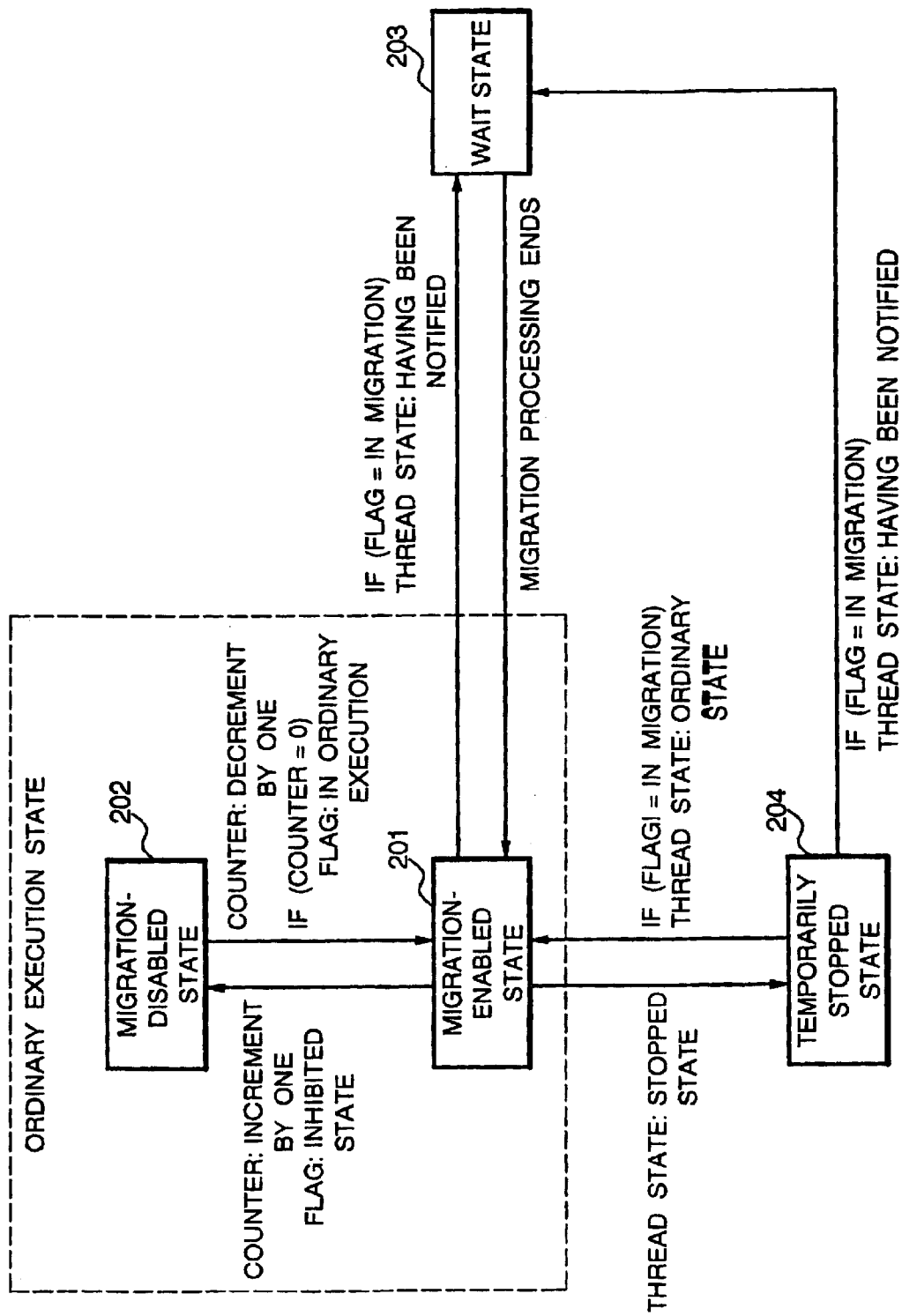
FIG. 2 is a diagram showing a state transition of an individual thread preserved in a thread state table.

FIG. 2 is a diagram showing a state transition of an individual thread preserved in the thread state table. When a thread included in a process is executing a program which can be migrated as shown in FIG. 2, the thread assumes the "migration-enabled state (201)".

When a program executed by a thread enters a migration-disabled state, that is, when the thread executes a migration-disabled code dependent on kinds of machines, for example, the thread increments the value of the migration inhibition counter 112 of the process by one and additionally sets the process status flag 111 of the process to be at "migration-disabled state (202)". When the program executed by the thread in question returns from the migration-disabled state to the migration-enabled state, that is, when the thread completes the execution of the migration-disabled code dependent on kinds of machines, for example, the thread in question decrements the value of the migration inhibition counter 112 of the process by one. Then, when the counter value attains 0, the thread returns the process status flag 111 of the process from the state of "migration being inhibited" to "in ordinary execution" and returns its own state to "migration-enabled state (201)".

Figure 3:
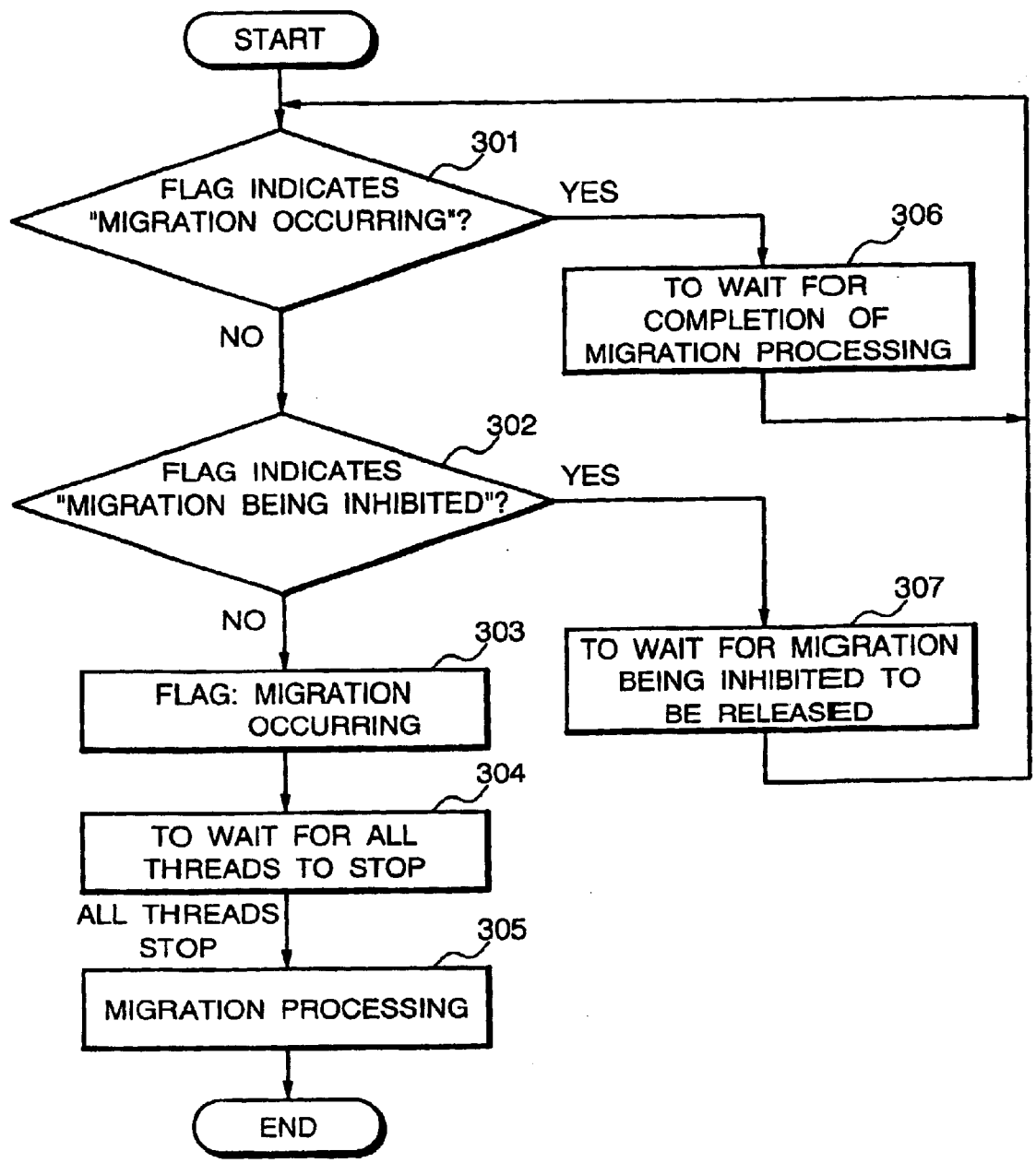
FIG. 3 is a flow chart showing a flow of processing of process migration execution.

FIG. 3 shows a flow of processing of the process migration execution. With reference to FIG. 3, first, a thread which intends to conduct process migration checks a status of a flag before starting migration processing (Steps 301 and 302). If the status of the flag is "in ordinary execution", the thread sets the status of the flag to "migration occurring" (Step 303) to wait for other thread to enter the wait state (Step 304).

When the determination is made at Step 301 that the status of the flag is "migration occurring", the thread waits for the execution of processing until the migration processing in question is completed (Step 306) and again tries a flag check after the migration processing in question is completed (Steps 301 and 302).

On the other hand, when the determination is made at Step 302 that the flag indicates "migration being inhibited", the thread waits for the execution of processing until the migration inhibited state is released (Step 307) and again tries a flag check after the migration inhibited state in question is released (Steps 301 and 302).

Each thread in ordinary execution periodically checks the process status flag 111 while executing a program code. Then, in other cases than when the contents of the process status flag 111 correspond to "migration occurring", the thread continues operation (Step 301). When the process status flag 111 is at the state of "migration occurring" at the check, each thread sets its own state to be "having been notified", as well as notifying a thread migrating of the fact that the thread in question has stopped and stopping execution to enter the wait state 203.

A thread to conduct process migration, when states of all the other threads than the thread itself enter the "wait state", considers that preparations for migration are completed to move onto actual process migration processing (Step 305). In process migration processing, through the transfer of the contents of the process 114 as a target to be migrated, the process is migrated.

On the other hand, when execution of a thread is temporarily stopped due to suspend, sleep, waiting for synchronization with other thread, etc., the thread in question sets its own state to be "temporarily stopped state (204)" before the execution enters the temporarily stopped state. When a thread to conduct process migration checks a state of other thread, the thread regards a thread at the "temporarily stopped state" to be similar to "having been notified" and does not wait for the thread in question to enter the wait state (203).

To the contrary, when the thread at the temporarily stopped state (204) resumes execution, the thread first checks the process status flag 111 and when the flag indicates other states than "migration occurring", returns the state of the thread to "in ordinary execution (201)" to resume operation. When the flag indicates "migration occurring", the state of the thread is set to "wait state (203)" to interrupt execution.

When the migration processing ends, the thread entering the wait state returns to the migration-enabled state (201) to continue execution. When a thread at a migration source is to be deleted as a result of process migration, a deletion instruction is separately sent from the migration processing to the thread and the thread ends execution simultaneously with the resumption of the execution.

The foregoing operation enables process migration occurring timing to be managed such that process migration is conducted only when all the threads in the process are migration-enabled. The operation also allows migration of a thread whose execution is temporarily stopped due to suspend, sleep, waiting for synchronization with other thread, etc. In addition, since at the time of migration, only a thread which is to conduct migration processing operates and the other threads stop in a safe state, migration processing can be safely conducted while avoiding such a situation that while information within the process is transferred for process migration, other thread rewrites the information within the process to result in causing a conflict in the transferred information within the process.

Figure 4:
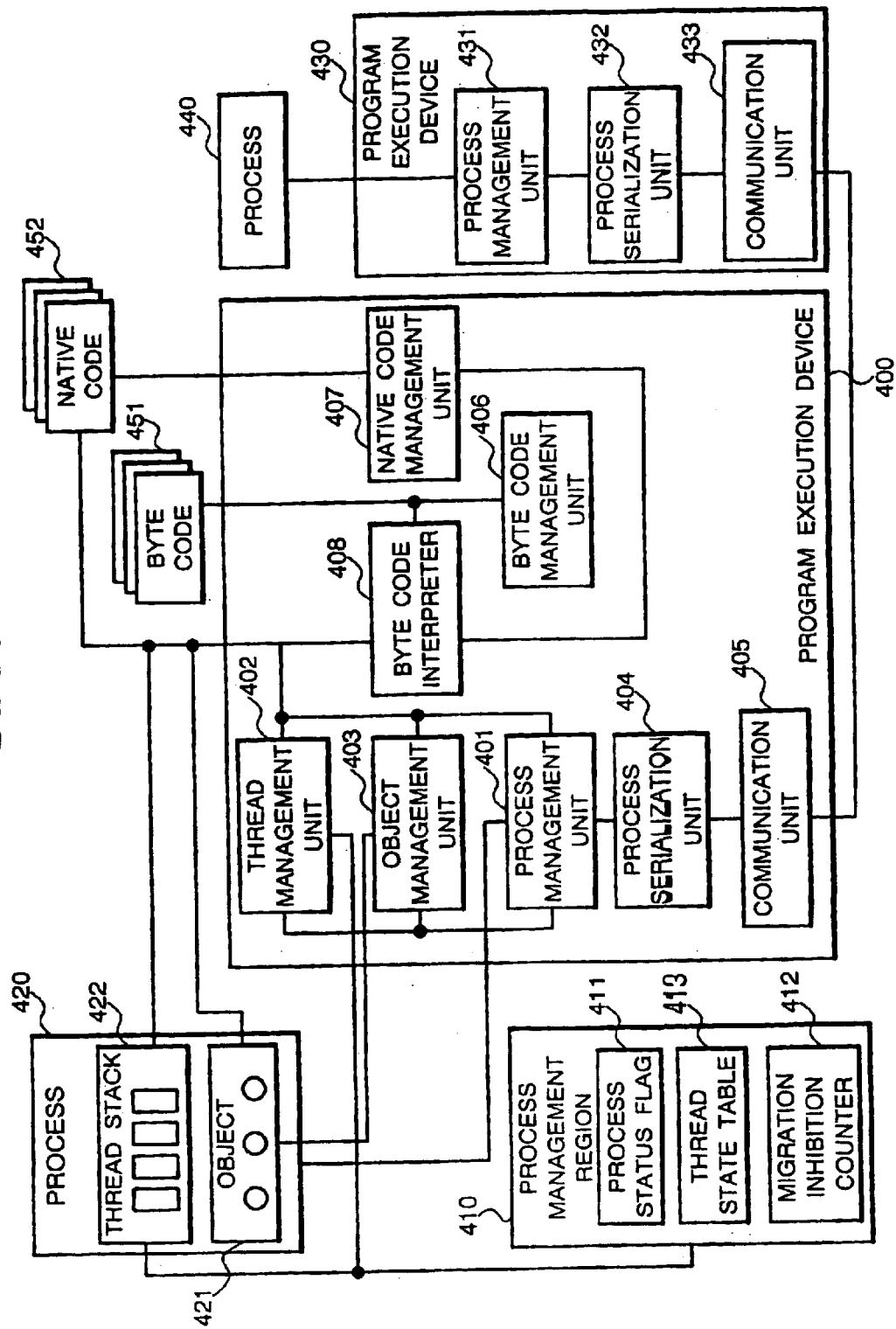
FIG. 4 is a block diagram showing structure of a program execution device according one embodiment of the present invention.

FIG. 4 is a block diagram showing structure of a program execution device according to one embodiment of the present invention. With reference to FIG. 4, a program execution device 400 of the present embodiment includes the above-described process management unit 401 and thread management unit 402, as well as including an object management unit 403, a process serialization unit 404, a communication unit 405, a management unit 406 for a byte code as a computer-independent program code, a management unit 407 for a native code as a computer-dependent program code, and a byte code interpreter 408. In FIG. 4, illustration is made only of a characteristic part of the structure of the present embodiment and that of the remaining common part is omitted.

The respective components of the present embodiment are implemented by program-controlled CPU and RAM or other internal memory in a computer system (e.g. personal computer and workstation) as a program execution device. A computer program for controlling the CPU is provided being stored in a common storage medium such as a magnetic disc, an optical disc and a semiconductor memory and loaded into the internal memory of the computer system to control the CPU, thereby executing functions of the components which will be described later.

The program executed in the present embodiment is assumed to be described with a byte code 451 independent of a computer and a native code 452 dependent on a computer mixed together. The byte code 451 is read into the byte code management unit 406 and executed by the byte code interpreter 408. The native code is directly executed by the CPU outside the program execution device.

A process 420 operating on the program execution device 400 has an object 421 and a thread stack 422.

Further provided in the program execution device 400 is a process management region 410 peculiar to each process. The process management region 410 has a process status flag 411, a thread state table 413 and a migration inhibition counter 412.

In FIG. 4, a program execution device 430 is other program execution device in operation which is connected to the program execution device 400 through a network and has the same structure as that of the program execution device 400.

Execution of the program is done through operation of the object 421 and the thread stack 422 in the process 420 by the execution of the byte code 451 by the byte code interpreter 408 or direct execution of the native code 452. The byte code 451 and the native code 452 are allowed to call each other during execution. In addition, both the byte code 451 and the native code 452 are allowed to call the thread management unit 402 to execute synchronization processing among threads and thread control processing such as suspend and sleep, and execute generation of a new thread and deletion.

The byte code 451 is also allowed to call the process management unit 401 to conduct process migration processing. On the other hand, during the execution of the native code 452, it is considered that process migration is impossible. Then, at the call of the native code 452, the process management unit 401 is instructed to increment the migration inhibition counter by one. In response to such an instruction, the process management unit 401 increments the migration inhibition counter 412 by one. When the migration inhibition counter 412 takes other value than zero, the process status flag 411 is set to "migration being inhibited".

This setting will not be released even when the byte code 451 is called during execution of the native code 452. Then, when the execution of the native code 452 is completed, the process management unit 401 is instructed to decrement the counter by one. The process management unit 401 decrements the migration inhibition counter 412 by one. When the counter takes the value of zero, the process status flag 411 is returned to "in ordinary execution".

When a thread in the process finds a process migration instruction during the execution of a byte code, the byte code interpreter 408 calls the process migration instruction of the process management unit 401. According to the process migration instruction, first check whether the thread itself which has called is inhibiting migration or not and when it is inhibiting the migration, return "migration failure".

On the other hand, when the thread is not inhibiting migration, the process management unit 401 tries to set the process status flag 411 to be "in migration". At this time point, unless the process status flag 411 indicates "in ordinary execution", the process management unit 401 waits for the process status flag 411 to return to "in ordinary execution" while stopping the execution of the thread as a migration requesting source. When the process status flag 411 indicates "in ordinary execution", the process management unit 401 sets the process status flag 411 to "migration occurring" and checks states of all the threads existing in the process 420 which are put in the thread state table 106 to wait for all the states to be set to "wait state" or "temporarily stopped state".

The byte code interpreter 408 periodically calls the process management unit 401 during the execution of the byte code 451 to check the process status flag 411. In other cases than when the process status flag 411 indicates "migration occurring", no call is made to return.

On the other hand, when the process status flag 411 indicates "migration occurring", the process management unit 401 sets a thread state of the calling source thread to "wait state", as well as temporarily stopping the calling source thread. In addition, when all the other threads than the process migration calling source assume the "wait state" or the "temporarily stopped state", the unit 401 causes the thread which is calling process migration to resume the execution and execute migration processing.

When all the threads in the process excluding the process migration calling source stop, the process management unit 401 continues process migration processing. More specifically, the unit 401 serializes all the objects 421 and the thread stacks 422 in the processing by means of the process serialization unit 404 and transfers the serialized objects and thread stacks to other program execution device 430 through the communication unit 405.

At the program execution device 430 as a receiver, a process management mechanism 431 newly generates a free process 440 and reproduces, in the process, the objects and the thread stacks received through a process serialization mechanism 432 to resume execution of all the threads included in the process.

When the process migration succeeds, the process management unit 401 of a migration source, after giving a thread completion instruction to all the threads having been migrated, returns the contents of all the thread state tables 413 in the process to "in ordinary execution" to cause the thread to resume its stopped execution. When the process migration fails, the unit 401 immediately returns the contents of all the thread state tables 413 in the process to "in ordinary execution" and cause the thread to resume its stopped execution. When the thread has received a stop instruction, the unit 401 ends its own thread immediately after the resumption.

Figure 5:
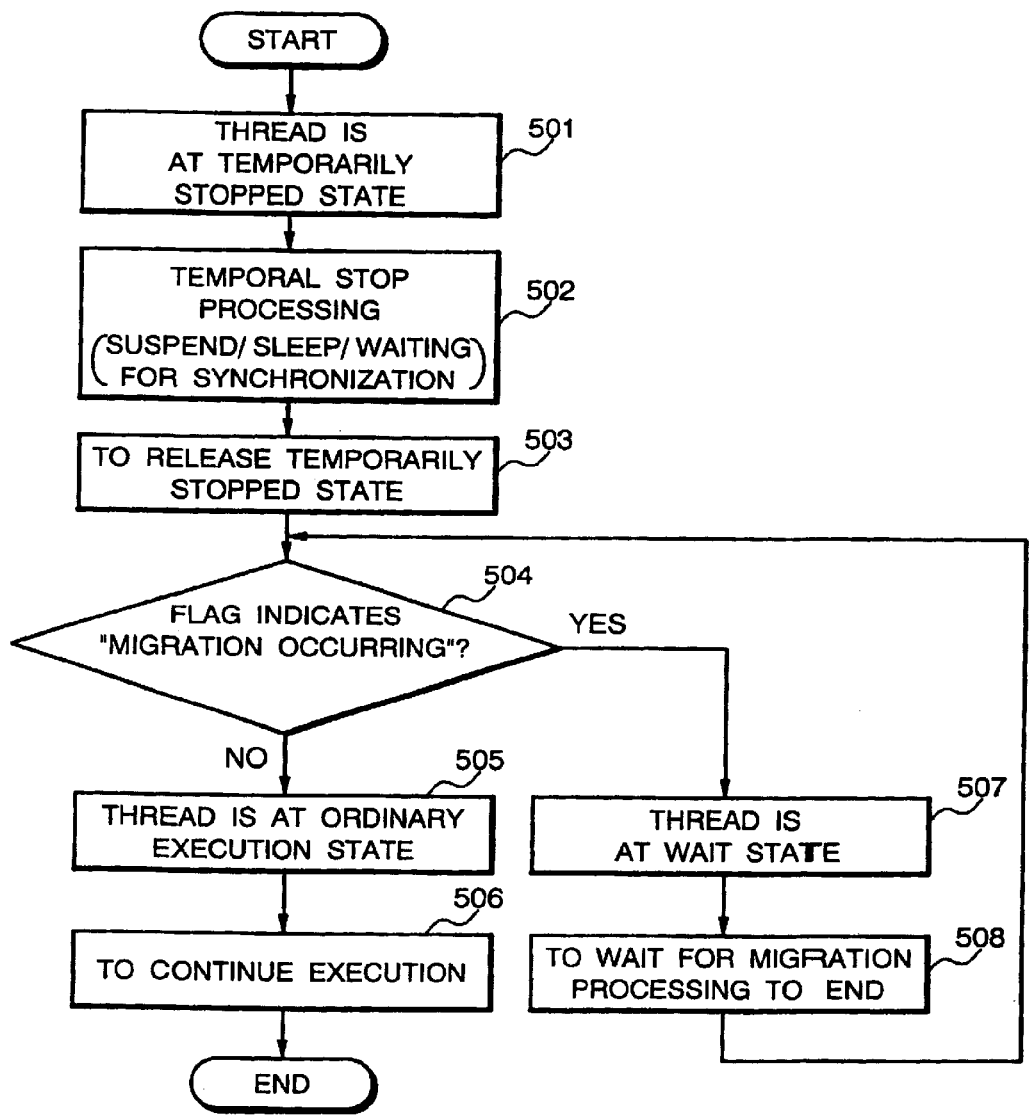
FIG. 5 is a flow chart showing operation conducted when a thread enters a temporally stopped state in the present embodiment.

FIG. 5 is a flow chart showing operation conducted when a thread enters a temporarily stopped state. When a thread executes suspend, sleep or waiting for synchronization with other thread, the byte code interpreter 408 and the native code 452 call these functions of the thread management unit 402.

With reference to FIG. 5, the thread management unit 402 first sets a thread state 106 of a thread as a target to "temporarily stopped" (Step 501) and then actually sets the thread to be at the state of suspend, sleep or waiting for synchronization (Step 502). These stopped states are preserved also in the thread stack 422 and set such that if process migration occurs during temporal stop, the temporarily stopped state is reproduced at a program execution device as a migration destination by means of the process serialization unit 404. When process migration occurs during temporal stop and an end instruction is given to a thread which has succeeded in the migration to be at a stopped state, the temporal stop is released at that time point, whereby the thread ends simultaneously with the resumption of the execution.

Next, when the temporarily stopped state is released because of resumption, returning from sleep and coming into synchronization (Step 503), the thread management unit 402 first checks the process status flag 411 (Step 504).

Here, in a case where the process status flag 411 indicates "in the execution of migration", the thread management unit 402 changes the contents of the thread state table 413 to "waiting" (Step 507) and keeps the execution halted until the end of migration processing.

On the other hand, in a case where the process status flag 411 indicates a state other than "in the execution of migration", the thread management unit 402 returns the thread state 106 to the "ordinary execution state" (Step 505) to make the execution operation in question continue (Step 506).

Next, an example of operation of a specific process will be described. Here, description will be made of an example of describing, in multi-thread, a process of automatically changing numerical calculation execution place by a load of the computer.

Figure 6:
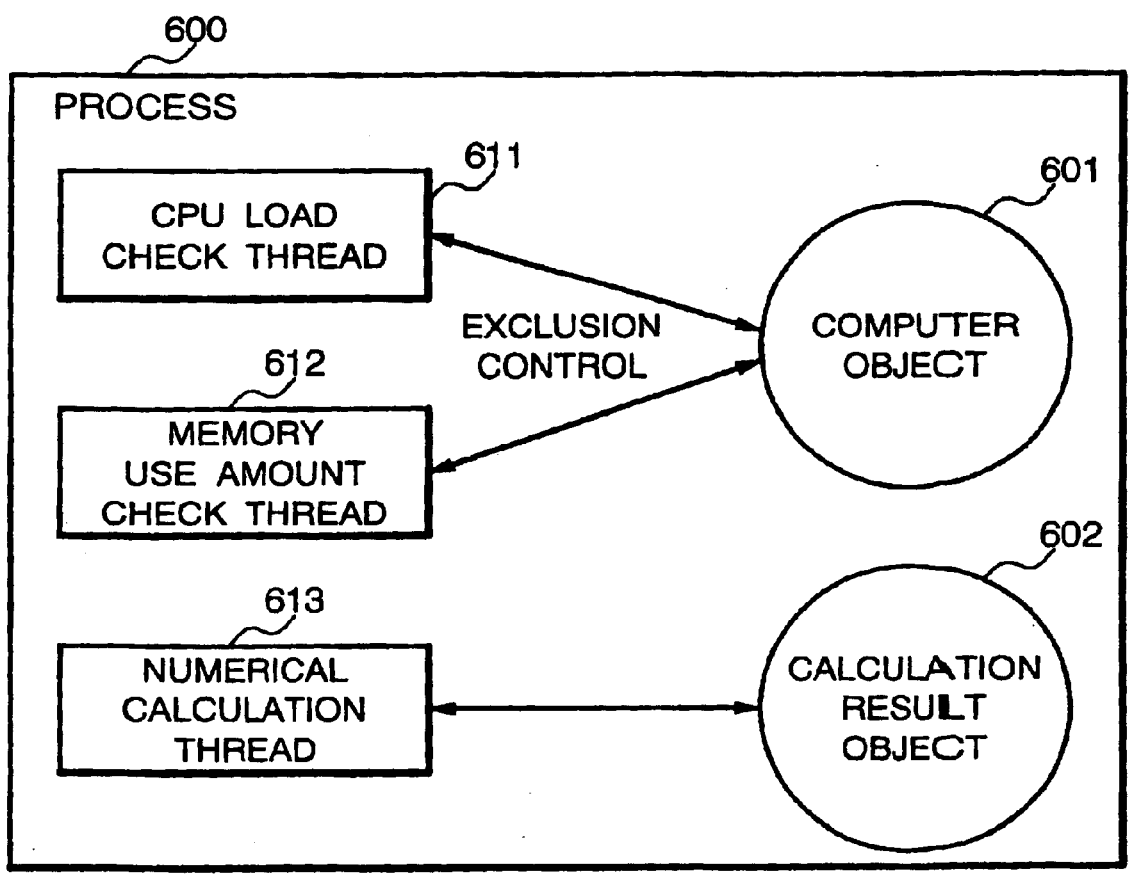
FIG. 6 is a diagram showing an example of structure of a process for use in the operation of the present embodiment.

FIG. 6 is a diagram showing structure of a process for use in the present operation example. With reference to FIG. 6, a process 600 has three threads 611, 612 and 613 and two objects 601 and 602. The object 601 is a computer object which holds a state of a computer such as a CPU load and an amount of memory use and the object 602 is a calculation result object which holds a calculation result obtained at an arbitrary stage of numerical calculation. The thread 611 is a thread for checking a CPU load of the system every second which repeats one-second sleep, processing of inquiring of the operating system about a CPU load and reflecting of a result on the computer object. The thread 612 is a thread for checking the amount of memory use of the system every second which repeats one-second sleep, processing of inquiring of the operating system about a memory use amount and reflecting of a result on the computer object. The thread 613 is a thread for conducting appropriate numerical calculation processing which repeats processing of repeatedly calling several computation functions by using the contents of the calculation result object and reflecting the result on the calculation result object.

At the time of reflecting CPU load and memory use amount data on the computer object, when these values exceed a fixed value, a process migration instruction is given to other computer with a small load.

The processing of inquiring of the operating system about a memory use amount and a CPU load are respectively described as a native code. Part of the function of the numerical calculation processing where the amount of calculation is in particular large is described as a native code for the purpose of speeding up processing. The remaining part of the processing is all described as a byte code.

It is also assumed that computer object information updating processing is exclusively controlled and allowed to process one thread at one time.

Execution of a process migration instruction will be done by either the thread 611 or 612 and at the time of calling the thread, states of the remaining two threads are arbitrarily determined depending on scheduling of a thread scheduler.

Figure 7A:
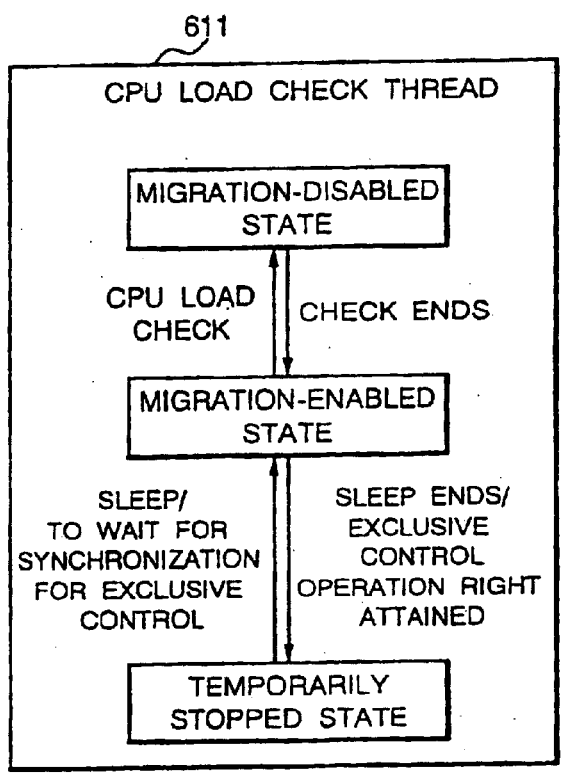
FIG. 7 is a diagram showing a state transition of each thread of the process shown in FIG. 6.
Figure 7B:
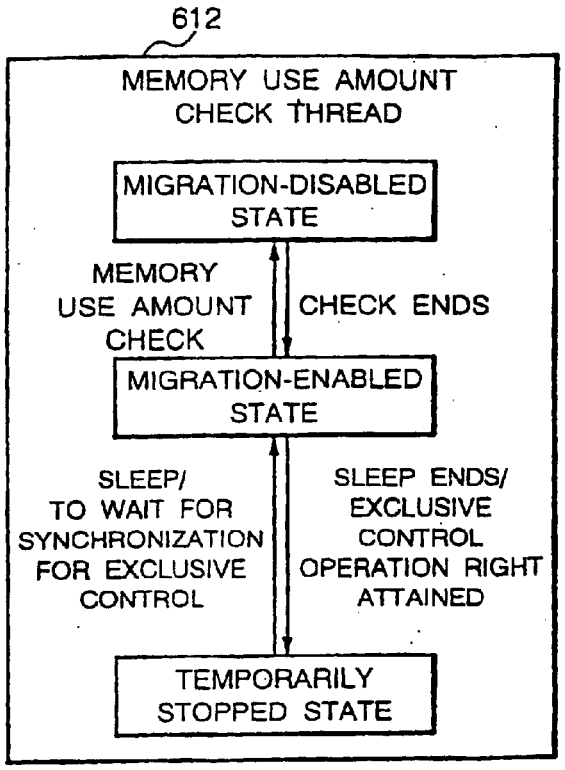
Figure 7C:
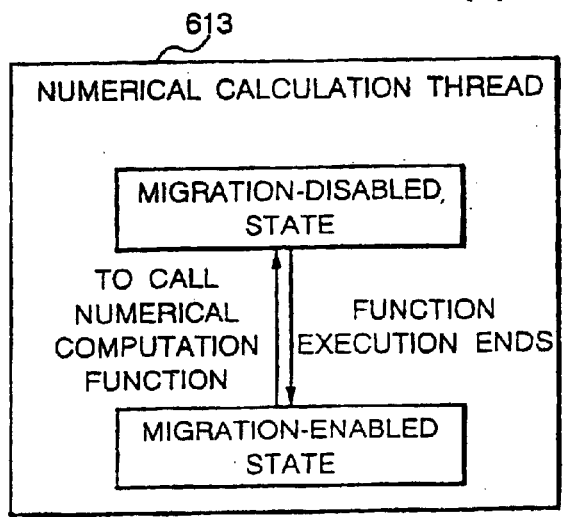

Since the threads 611 and 612 for checking a CPU load and a memory use amount include execution of both of a byte code and a native code and are controlled exclusively to each other regarding operation of the computer object, when the two threads are to be operated simultaneously, one of the two enters a synchronization waiting state. The numerical calculation thread 613 includes execution of both a computer-dependent code and a computer-independent code. Under these conditions, states that the threads 611, 612 and 613 can assume are as shown in FIG. 7.

The respective threads 611, 612 and 613 enter a migration-disabled state only at the call of a native code and return to a migration-enabled state immediately after the call is finished. As to the two check threads 611 and 612, when the two access the computer object simultaneously, one enters the temporarily stopped state, and returns to the migration-enabled state when the other finishes access. Also, the two check threads 611 and 612 are temporarily stopped at a sleep state and return to the migration-enabled state again when they wake up. Moreover, the two check threads 611 and 612 give a process migration instruction at arbitrary timing during the execution at the migration-enabled state. In addition, the three threads 611, 612 and 613 operate completely independently in parallel to each other except for the time of waiting for synchronization for exclusive control. Therefore, when a thread is to give a process migration instruction, it is unpredictable in advance at which state other thread is.

Figure 8:
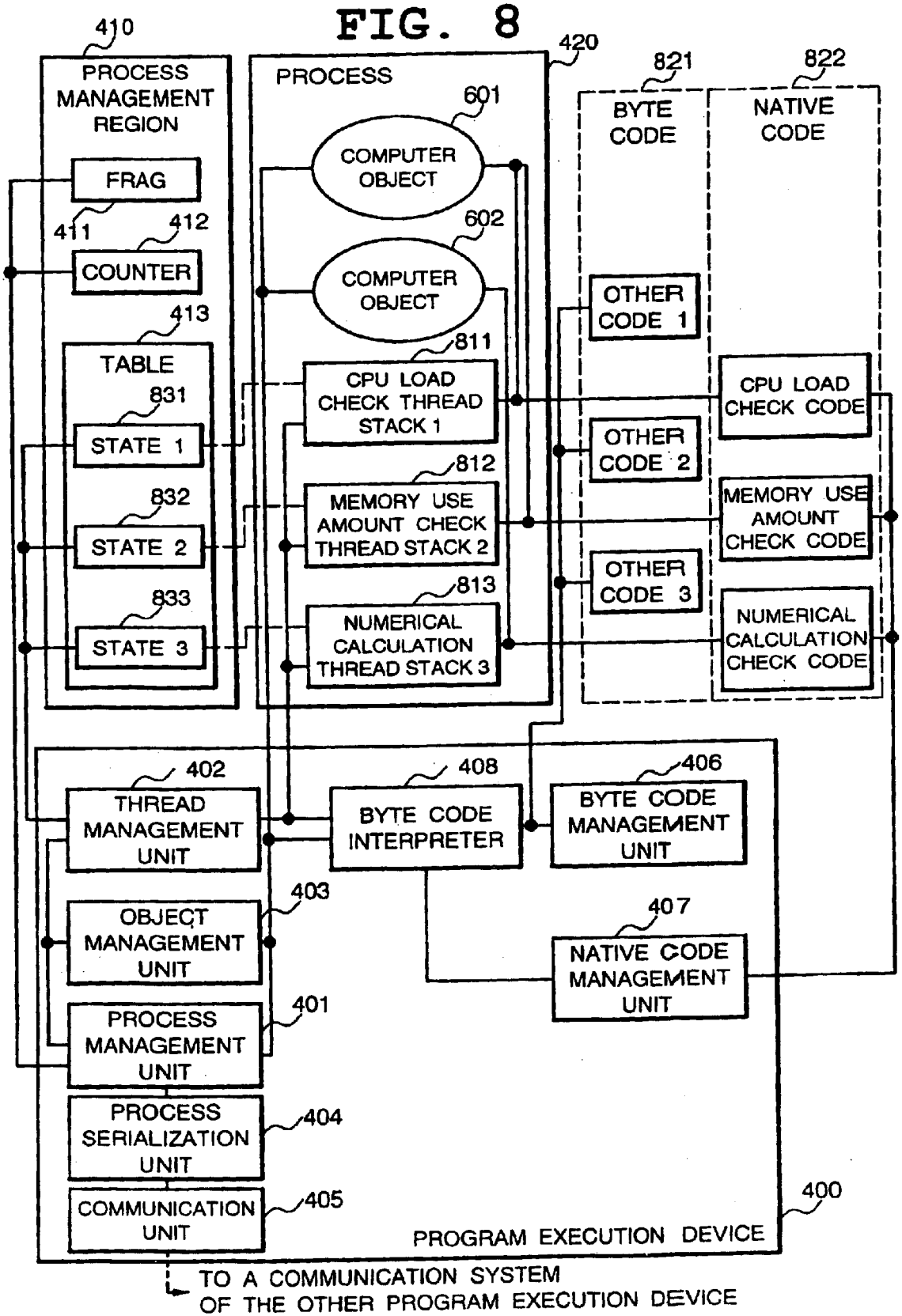
FIG. 8 is a block diagram showing specific structure of the process shown in FIG. 6 at the execution according to the present embodiment.

On the foregoing premise, the present operation example will be described with reference to FIG. 8. FIG. 8 is a block diagram showing specific structure of a program execution device for executing the process illustrated in FIG. 6 according to the present embodiment.

On the program execution device 400, the process 410 managed by the process management unit 401 exists, in which there exist a computer object 601 and a calculation result object 602 managed by the object management unit 403, a thread stack 811 of a CPU load check thread 611 managed by the thread management unit 402, and a thread stack 812 of a memory use amount check thread 612 and a thread stack 813 of a numerical calculation thread 613. Exist as program codes are a byte code 821 managed by the byte code management unit 406 and executed by the byte code interpreter 408 and a native code 822 managed by the native code management unit 407.

The byte code interpreter 408 executes the byte code 821 to update the contents of each thread stack and object, as well as calling the native code 822 through the native code management unit 407. For executing the CPU load check thread 611, for example, the byte code interpreter 408 first calls a CPU load check code. Since the CPU load check code is a native code, the byte code interpreter 408 calls the process management unit 401 to increment the migration inhibition counter 412 by one. As a result, the migration inhibition counter 412 takes a value other than zero, whereby the process status flag 411 is set to "migration being inhibited" at the same time.

When the CPU load check code finishes the execution, the execution returns to the byte code interpreter 408, so that the byte code interpreter 408 calls the process management unit 401 to decrement the value of the migration inhibition counter 412 by one. At this time, unless the other two threads 612 and 613 are executing a memory use amount check code or a numerical calculation code, the migration inhibition counter 412 returns to zero, whereby the process status flag 411 is also returned to "in ordinary execution".

Thereafter, the byte code interpreter 408 calls the thread management unit 402 for exclusive control and after obtaining an operation right of the computer object 601, reflects the execution result of the CPU load check code on the computer object 601 and again calls the thread management unit 402 to free the operation right of the computer object 601. Then, the interpreter 408 calls the thread management unit 402 to make the thread sleep one second.

In the operation of the CPU load check thread 611, the foregoing operation will be repeatedly executed.

Operation of the memory use amount check thread 612 is substantially the same as that of the above-described CPU load check thread 611 with the only difference being that a native code to be called is a memory use amount check code.

In the operation of the numerical calculation thread 613, the byte code interpreter 408 executes a byte code for numerical calculation and calls a native code as required. In any execution, the contents of the calculation result object 602 are suitably referred to and updated. For calling a numerical calculation code of a native code, the value of the migration inhibition counter 412 is incremented by one and the process status flag 411 is set to "migration being inhibited" similarly to the cases of the other threads 611 and 612.

Byte codes executed by the CPU load check thread 611 or the memory use amount check thread 612, when determining that a load of a computer is large when a check result is reflected on the computer object, executes a process migration instruction. For example, assume that determination is made that a load is large when the CPU load check thread 611 reflects a check result.

At this time, the byte code interpreter 408 calls a process migration function of the process management unit 401. The process management unit 401 checks the process status flag 411 to check a current state of the process. Then, when either or both of the memory use amount check code and the numerical calculation code are in execution, the process status flag 411 indicates "migration being inhibited", so that the process migration processing can not be started. In this case, the unit 401 waits for these codes to finish execution and as soon as the process status flag 411 indicates the "in ordinary execution", enters migration processing.

If the process status flag 411 is indicating "in ordinary execution", the process management unit 401 sets the process status flag 411 to "migration occurring". At this time, the numerical calculation thread is either at the "migration-enabled state" or "migration-disabled state" without fail and the migration inhibition counter 412 takes the value of zero. Therefore, when the process status flag 411 is set to be "migration occurring", the numerical calculation thread 613 is executing a byte code at the byte code interpreter 408.

Since at the byte code interpreter 408, the process status flag 411 is periodically checked, the numerical calculation thread 613 will in due time set the thread state to "waiting" to enter the temporarily stopped state. On the other hand, the memory use amount check thread 612 might assume the "temporarily stopped state", in addition to "migration-enabled state", due to one-minute sleep or exclusive control regarding operation of the computer object. When the thread 612 is at the migration-enabled state, a byte code is being executed at the byte code interpreter 408 similarly to the case of the numerical calculation thread 613, so that the thread will check the process status flag 411 in due time to enter the "waiting" state. In any case, when the flag enters the state of "migration being executed", all the threads other than itself in the process enter the "waiting" state or "temporarily stopped state" in due time. Although a state of the CPU load check thread 611 which has called the migration instruction remains "in ordinary execution", it is clear that the thread is currently calling the process migration function to stop, whereby all the threads in the process are considered to be stopped at this time point.

Thereafter, the process management unit 401 serializes all the states of the two objects 601 and 602 and the three thread stacks 611, 612 and 613 (811, 812 and 813) in the process by means of the process serialization unit 404 and migrate the serialized objects and stacks to other computer designated by a migration instruction through the communication unit 405.

When the migration succeeds, the process management unit 401 gives a thread deletion instruction to the three threads 611, 612, 613 (811, 812 and 813) to stop operation, as well as deleting all of the objects 601 and 602 to completely remove the process from the program execution device 400, thereby establishing migration.

The program execution device as a migration destination re-establishes objects and thread stacks of the process based on the received data to resume execution. As a result, the CPU check thread 811, from a time point of the execution completion of the process migration instruction, the numerical calculation thread 813, from a time point when it enters the "waiting" state, and the memory use amount check thread 812, from a time point when it enters the "waiting" state or from the state of sleep or synchronization waiting, respectively resume the execution. The foregoing operation realizes safe migration of the process in which three threads 611, 612 and 613 (811, 812 and 813) operate independently in parallel to each other.

Although the present invention has been described with respect to the preferred embodiments in the foregoing, the present invention is not necessarily limited to the above-described embodiments.

For example, although the above-described embodiments have been described with respect to realization by an object-oriented language, the language may not be object-oriented but be a procedure language or a functional language. In this case, the object group is changed to a heap region. Structure of the program execution device in this case is shown in FIG. 9.

Figure 9:
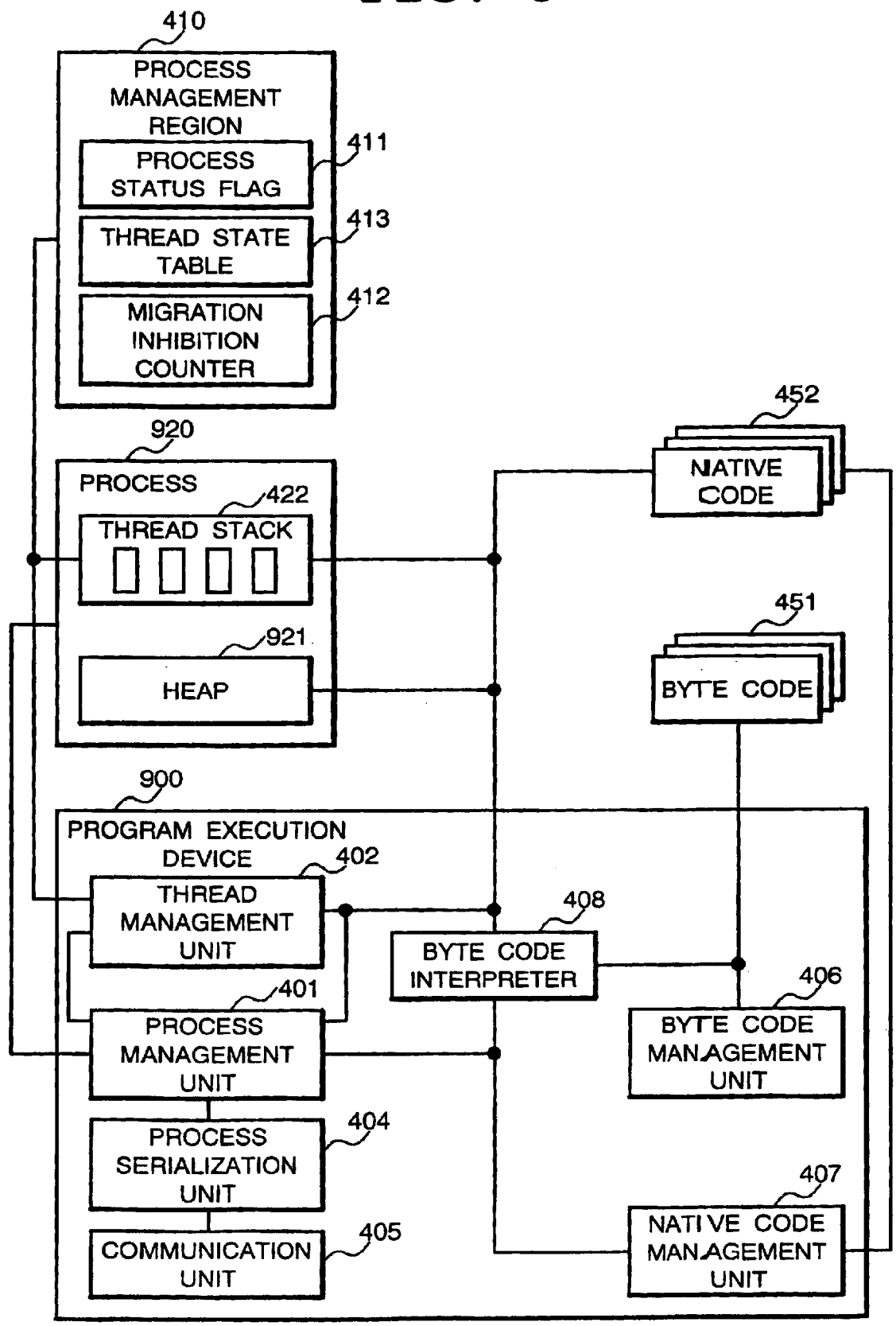
FIG. 9 is a block diagram showing structure of another embodiment of the present invention.

With reference to FIG. 9, a program execution device 900 includes a process management unit 401 and a thread management unit 402, as well as including a process serialization unit 404, a communication unit 405, a management unit 406 for a byte code as a computer-independent program code, a management unit 407 for a native code as a computer-dependent program code and a byte code interpreter 408. In other words, as compared with the embodiment shown in FIG. 4, the present structure fails to include the object management unit 403. In addition, in a process 920, a heap region 921 exists in place of the object 421.

Since an individual component of the program execution device shown in FIG. 9 is the same as its counterpart component in the embodiment shown in FIG. 4, the same reference numerals are allotted thereto to omit its description.

Operation of the present program execution device is the same as that of the above-described embodiment with the only difference being that execution of the byte code 451 and execution of the native code 452 done by the byte code interpreter 408 is made not by an object but by directly operating a heap.

In addition, although in the above-described embodiment, the thread management unit 402 is included in every program execution device, the thread management unit 402 may be divided into a function of conducting thread scheduling etc. and a function of conducing state change of a process management region, and as the thread scheduling function, a threading function which the operating system has may be used. In such a case, as long as the operating system supports thread distribution to a multi-CPU, a process migration function of a multi-thread can be utilized while making use of the function of distributing loads to the multi-CPU. Structure of the program execution device in this case is shown in FIG. 10.

Figure 10:
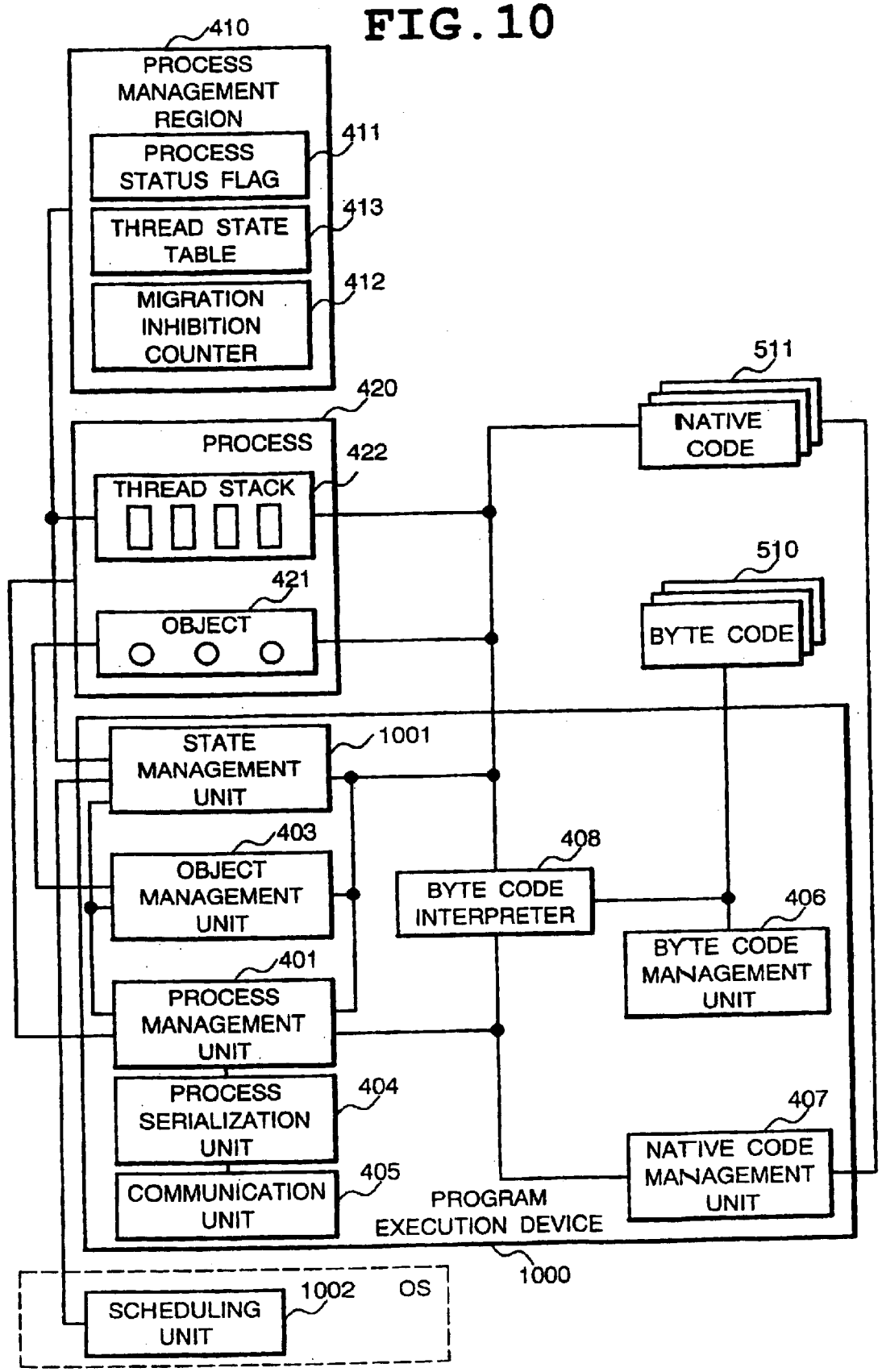
FIG. 10 is a block diagram showing structure of other embodiment of the present invention.

With reference to FIG. 10, a program execution device 1000 includes a process management unit 401 and a state management unit 1001, as well as including an object management unit 403, a process serialization unit 404, a communication unit 405, a management unit 406 for a byte code as a computer-independent program code, a management unit 407 for a native code as a computer-dependent program code and a byte code interpreter 408. In addition, the operating system includes a scheduling unit 1002. Here, the state management unit 1001 and the scheduling unit 1002 are equivalent to the thread management unit 402 of the embodiment shown in FIG. 4. Then, the state management unit 1001 calls a necessary function of the scheduling unit 1002 as required.

Since the individual component of the program execution device shown in FIG. 10 is the same as its counterpart component in the embodiment shown in FIG. 4, the same reference numerals are allotted thereto to omit its description.

Furthermore, although in the above-described embodiment, determination whether a thread is allowed to migrate or not is made by whether it executes a computer-dependent code or not, the determination may be made by a code embedded by a user programmer in a program code for declaring migration-enabled or migration-disabled.

In this arrangement, although the user programmer needs to pay attention to properly declare the number of times, timing, etc., timing of enabling and disabling process migration can be controlled more minutely. Structure of the program execution device in this case is shown in FIG. 11.

Figure 11:
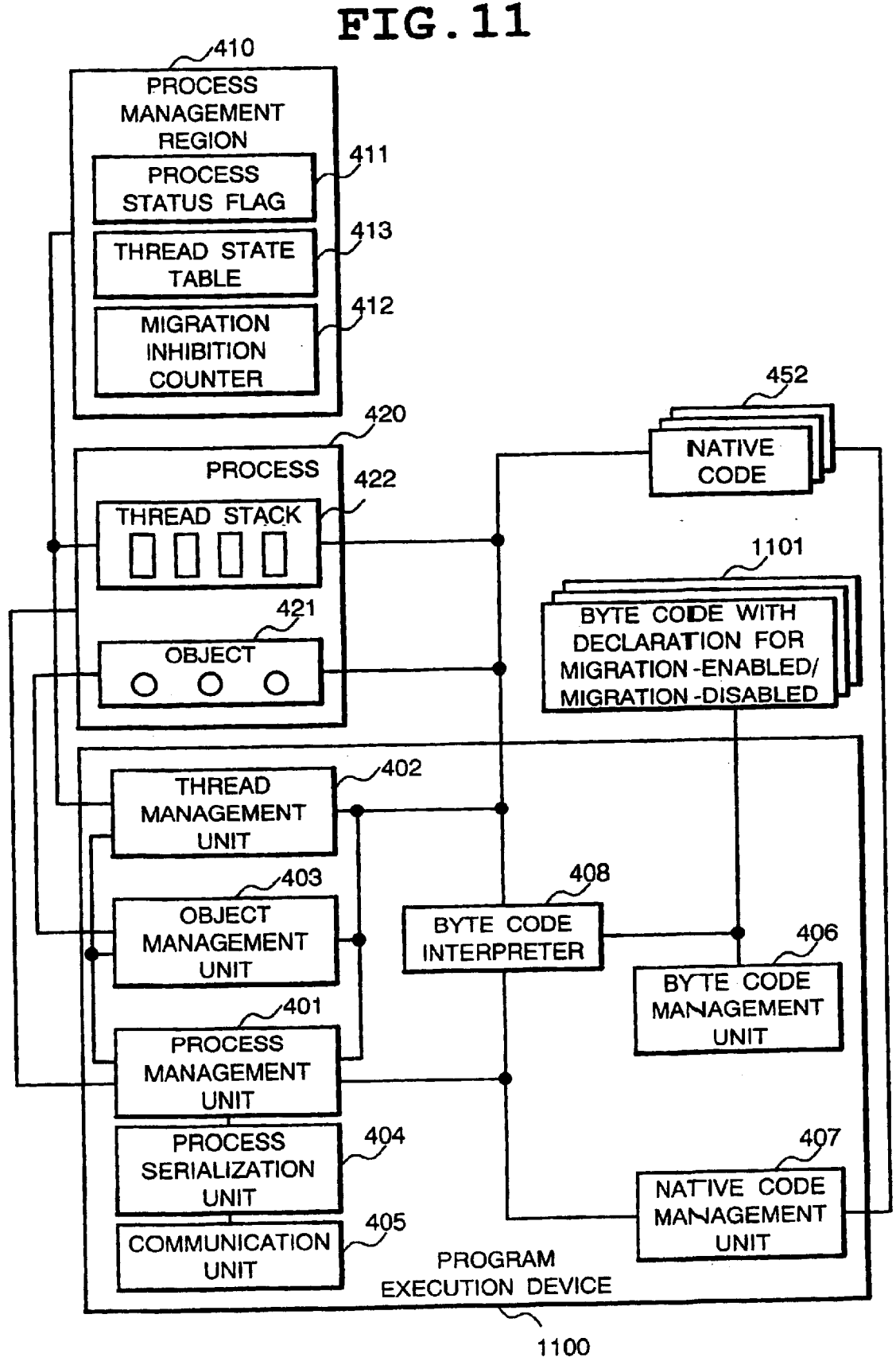
FIG. 11 is a block diagram showing structure of a further embodiment of the present invention.

With reference to FIG. 11, a program execution device 1100 includes a process management unit 401 and a thread management unit 402, as well as including an object management unit 403, a process serialization unit 404, a communication unit 405, a management unit 406 for a byte code as a computer-independent program code, a management unit 407 for a native code as a computer-dependent program code, and a byte code interpreter 408. Then, a byte code 1101 managed by the byte code management unit 406 holds an instruction which directly declares whether a thread is at the migration-enabled state or migration-disabled state. When this instruction is called, the byte code interpreter 408 calls the thread state change function of the thread management unit 402.

Since the individual component of the program execution device shown in FIG. 11 is the same as its counterpart component in the embodiment shown in FIG. 4, the same reference numerals are allotted thereto to omit its description.

Moreover, although in the above-described embodiment, a thread periodically checks a flag, the flag check may be conducted at the timing of switching a thread by a thread scheduler. Any flag check timing is possible as long as object states and a thread stack value include no conflict and it is ensured that the check is executed at a predetermined time point without fail.

Furthermore, although in the above-described embodiment, a migration-enabled program code is executed on an interpreter, a native code may be executed which has a mechanism for periodically checking a flag. In this case, however, since a thread stack execution state depends on a computer, a dedicated thread stack serialization function is required for changing the state to be computer-independent and transferring the same. Structure of the program execution device in this case is shown in FIG. 12.

Figure 12:
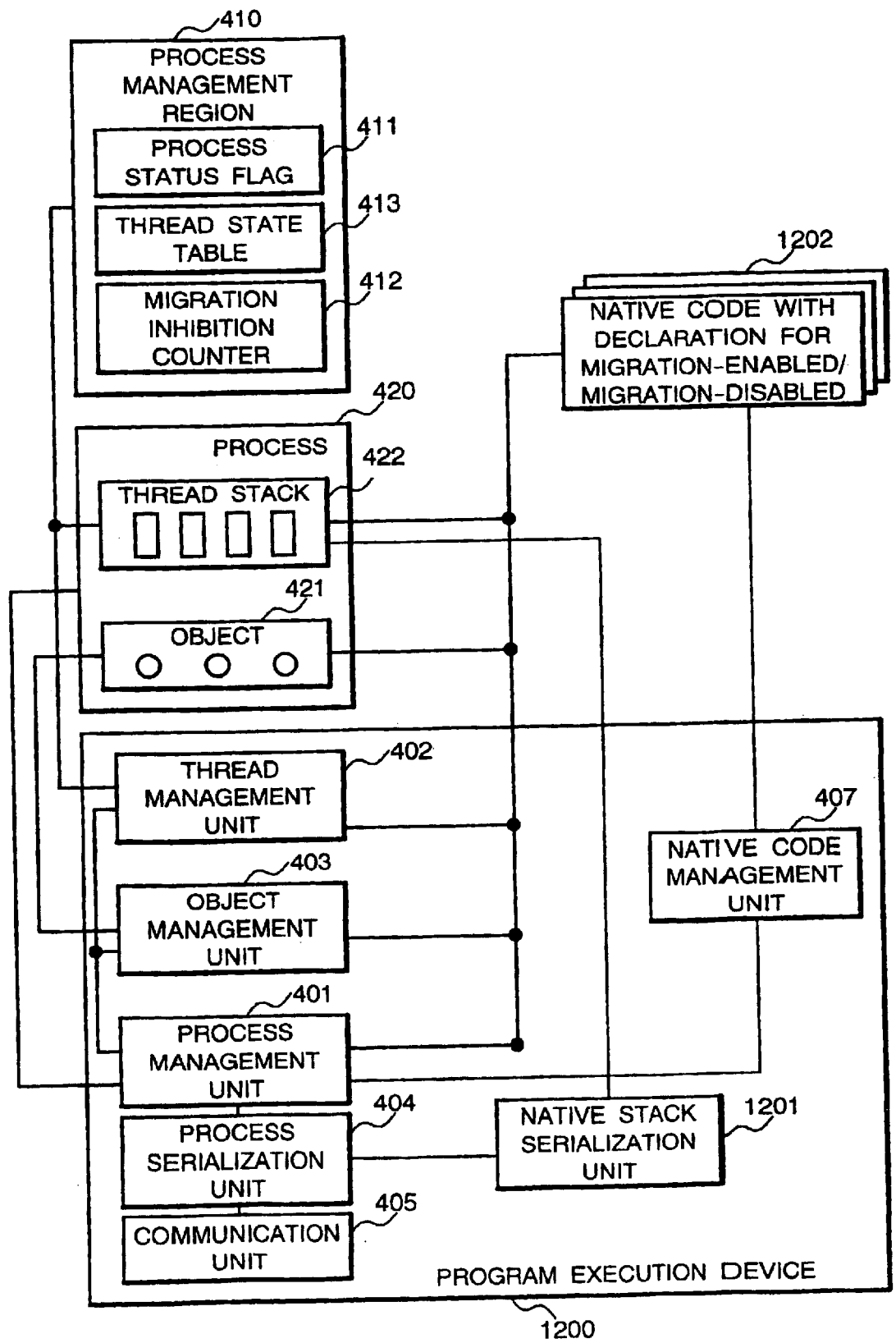
FIG. 12 is a block diagram showing structure of a still further embodiment of the present invention.

With reference to FIG. 12, a program execution device 1200 includes a process management unit 401 and a thread management unit 402, as well as including an object management unit 403, a process serialization unit 404, a communication unit 405, a native code management unit 407, and a native stack serialization unit 1201 for serializing a thread stack which executes a native code.

The program execution device of FIG. 12 regards a thread to be process-migration-enabled even when it executes a native code and does not set a thread to be at a migration-disabled state at native code calling. Instead, the native code 1202 periodically calls the thread management unit 402 during execution to check the state of the process status flag 411. In addition, at process migration, the process serialization unit 404 calls the native stack serialization unit 1201 for serializing a thread stack.

Since an individual component of the program execution device shown in FIG. 12 is the same as its counterpart component in the embodiment shown in FIG. 4, the same reference numerals are allotted thereto to omit its description.

As described in the foregoing, according to the program execution device and the process migrating method thereof and the storage medium which stores a process migration control program of the present invention, the provision of a thread management unit for holding a state of each thread within a process management region and a periodical check of a flag indicative of a process state enable other thread in execution to be safely stopped and a process operating in multi-thread to be serialized and transferred to a migration destination so as not to have a conflict, thereby enabling process migration of a process operating in multi-thread.

In addition, in the present invention, since a flag is provided which determines whether the process management region is inhibited from migrating or not and at the start of process migration by the process management unit, when the flag indicates "being inhibited", the unit will not start migration processing until the inhibition is released, timing when migration is enabled and timing when migration is disabled can be designated in the operation of each thread. This arrangement enables, in a process migration system extending over different computers, safe execution of processing even when a computer-independent migration-enabled code and a computer-dependent migration-disabled code exist together and safe execution of processing dependent on a device of a computer as an execution place etc.

In this case, it is possible to realize a process which migrates according to a computer load only by adding a separate thread without rectifying an existing numerical calculation program itself.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A program execution device connected to another program execution device and capable of migrating a process having multiple threads to said other program execution device while preserving an execution state of the process, comprising:

a process status flag indicating at least whether or not migration of the process is being inhibited by any thread in the process;

a thread status flag for each thread in the process indicating at least whether or not migration of the process is being disabled by the thread;

thread management means for setting the values of said thread status flags according to execution states of the threads and for setting the value of said process status flag to indicate that migration of the process is being inhibited if any of the thread status flags for the threads in the process indicate that migration of the process is being disabled by the thread; and process management means for referring to the value of said process status flag and allowing for the migration of the process only if the process status flag indicates that migration is not being inhibited wherein said process management means distinguishes, in a program code to be executed, a computer-independent code to be executed on an interpreter independently of a computer and a computer-dependent code to be executed directly by a CPU dependently on a computer, and when a thread is executing said computer-dependent code, sets the thread status flag for the thread to a migration-disabled state.

2. The program execution device as set forth in claim 1, wherein the thread status flag for each thread further indicates whether or not the thread is in a wait state;

the process status flag further indicates whether or not process migration is occurring;

each thread enters the wait state when the process status flag indicates that process migration is occurring; and said process management means executes processing for process migration when all the threads in the process enter the wait state.

3. The program execution device as set forth in claim 1, wherein said thread management means preserves information regarding temporarily stopped states for threads including suspend, sleep and synchronization waiting states on a thread stack, and restores the temporarily stopped state including the suspend, sleep or synchronization waiting state using the information regarding said temporarily stopped states on the thread stack received from another program execution device.

4. The program execution device as set forth in claim 1, wherein said thread management means includes:

state management means for operating said process status flag and said thread status flags, and scheduling means for conducting scheduling of a thread and synchronization and exclusive control among threads, said scheduling means being realized by a threading function of an operating system.

5. The program execution device as set forth in claim 1, wherein said process management means detects and discriminates codes instructions embedded in a program code which declare migration-enabled and migration-disabled, and when a thread is executing said program code including an instruction declaring migration-disabled, sets the thread status flag for the thread to the migration-disabled state.

6. A process migrating method of migrating, in a program execution device connected to another program execution device, a process having multiple threads to said other program execution device while preserving an execution state of the process, comprising the steps of:

setting, for each thread in the process, a thread status flag to indicate that process migration is being disabled whenever the thread enters a migration-disabled state, setting a process status flag to indicate that process migration is being inhibited whenever at least one thread status flag for a thread in the process indicates that process migration is being disabled, at the execution of a process migration instruction, checking the process status flag and only when process migration is not being inhibited, setting the process status flag to indicate that migration is being executed, checking said process status flag by each thread in execution in the process, when said process status flag has the value indicating that process migration is in execution, interrupting execution of the thread and placing the thread in a wait state, and when all the threads in the process enter the wait state, executing processing for process migration wherein at said step of setting, for each thread in the process, a thread status flag to indicate that process migration is being disabled whenever the thread enters a migration-disabled state, distinguishing, in a program code to be executed, between a computer-independent code to be executed on an interpreter independently of a computer and a computer-dependent code to be executed directly by a CPU dependently on a computer, and when a thread is executing said computer-dependent code, setting the thread status flag for the thread to indicate that the thread is at in a migration-disabled state.

7. The process migrating method as set forth in claim 6, wherein at said thread execution interrupting step, preserving information regarding temporarily stopped states of the thread including suspend, sleep and synchronization waiting states on a thread stack.

8. The process migrating method as set forth in claim 6, wherein at said step of checking said process status flag by each thread in execution in the process, checking the value of said process status flag periodically.

9. The process migrating method as set forth in claim 6, wherein instructions embedded in a program code which declare migration-enabled and migration-disabled are detected and discriminated, and when a thread is executing said program code including an instruction declaring migration-disabled, determination is made that the thread is at in the migration-disabled state.

10. A computer readable memory which stores a process migration control program for controlling a program execution device connected to another program execution device to migrate a process having multiple threads to said other program execution device while preserving an execution state of the process, said process migration control program comprising the steps of:

setting, for each thread in the process, a thread status flag to indicate that process migration is being disabled whenever the thread enters a migration-disabled state, setting a process status flag to indicate that process migration is being inhibited whenever at least one thread status flag for a thread in the process indicates that process migration is being disabled, at the execution of a process migration instruction, checking the process status flag and only when process migration is not being inhibited, setting the
process status flag to indicate that migration is being
executed, checking said process status flag at a by each thread in
execution in the process, when said process status flag has the value indicating
that process migration is in execution, interrupting
execution of the thread and placing the thread in a
wait state, and when all the threads in the process enter the wait state,
executing processing for process migration
wherein
said process migration control program
at said step of setting, for each thread in the process,
a thread status flag to indicate that process migration is being disabled whenever the thread enters
a migration-disabled state,
discriminates, in a program code to be executed,
between a computer-independent code to be
executed, on an interpreter independently of a
computer and a computer-dependent code to be
executed directly by a CPU dependently on a
computer, and
when a thread is executing said computer-dependent
code, determining that the thread is in a migration-disabled state.

11. The computer readable memory as set forth in claim 10, wherein
said process migration control program,
at said thread execution interrupting step,
preserves information regarding temporarily stopped
states of the thread including suspend, sleep and synchronization waiting states on a thread stack.

12. The computer readable memory as set forth in claim 10, wherein
said process migration control program,
at said step of checking said process status flag by each
thread in execution in the process, checking the value
of said process status flag periodically.

13. A program execution device connected to another
program execution device and capable of migrating a process having multiple threads to said other program execution
device while preserving an execution state of the process,
comprising:
a process status flag indicating at least whether or not
migration of the process is being inhibited by any
thread in the process;
a thread status flag for each thread in the process indicating at least whether or not migration of the process
is being disabled by the thread;
thread management unit which sets the values of said
thread status flags according to execution states of a the
threads and sets the value of said process status flag to
indicate that migration of the process is being inhibited
if any of the thread status flags for the threads in the
process indicate that migration of the process is being
disabled by the thread; and
process management unit which refers to the value of said
process status flag and allows for the migration of the
process only if the process status flag indicates that
migration is not being inhibited
wherein
said process management unit
distinguishes, in a program code to be executed, a
computer-independent code to be executed on an
interpreter independently of a computer and a
computer-dependent code to be executed directly by
a CPU dependently on a computer, and
when a thread is executing said computer-dependent
code, sets the thread status flag for the thread to a
migration-disable state.

14. The program execution device as set forth in claim 13, wherein
the thread status flag for each thread further indicates
whether or not the thread is in a wait state;
the process status flag further indicates whether or not
process migration is occurring;
each thread enters the wait state when the process status
flag indicates that process migration is occurring; and
said process management unit
executes processing for process migration when all the
threads in the process enter the wait state.

15. The program execution device as set forth in claim 13, wherein
said thread management unit
preserves information regarding temporarily stopped
states for threads including suspend, sleep and synchronization waiting states on a thread stack, and
restores the temporarily stopped state including the
suspend, sleep or synchronization waiting state using
the information regarding said temporarily stopped
states on the thread stack received from another program execution device.

16. The program execution device as set forth in claim 13, wherein
said thread management unit includes
state management unit which operates said process
status flag and said thread status flags, and
scheduling unit which conducts scheduling of a thread
and synchronization and exclusive control among
threads,
said scheduling unit being realized by a threading
function of an operating system.

17. A program execution device connected to another
program execution device and capable of migrating a process having multiple threads to said other program execution
device while preserving an execution state of the process,
comprising:
a process status flag indicating at least whether or not
migration of the process is being inhibited by any
thread in the process;
a thread status flag for each thread in the process indicating at least whether or not migration of the process
is being disabled by the thread;
a thread management means for setting the values of said
thread status flags according to execution states of the
threads and for setting the value of said process status
flag to indicate that migration of the process is being
inhibited if any of the thread status flags for the threads
in the process indicate that migration of the process is
being disabled by the thread; and
process management means for referring to the value of
said process status flag and allowing for the migration
of the process only if the process status flag indicates
that migration is not being inhibited, wherein:
said thread management means
preserves information regarding temporarily stopped
states for threads including suspend, sleep and synchronization waiting states on a thread stack, and
restores the temporarily stopped state including the
suspend, sleep or synchronization waiting state using the information regarding said temporarily stopped states on the thread stack received from another program execution device, and said process management means distinguishes, in a program code to be executed, a computer-independent code to be executed on an interpreter independently of a computer and a computer-dependent code to be executed directly by a CPU dependently on a computer, and when a thread is executing said computer-dependent code, sets the thread status flag for the thread to a migration-disabled state.

* * * * *